United States Patent [19]

MacKay

[11] 4,051,223
[45] Sept. 27, 1977

[54] PROCESS FOR THE RECOVERY OF MAGNESIUM

[75] Inventor: Kenneth D. MacKay, Circle Pines, Minn.

[73] Assignee: General Mills Chemicals, Inc., Minneapolis, Minn.

[21] Appl. No.: 630,599

[22] Filed: Nov. 10, 1975

[51] Int. Cl.$^2$ .............................................. B01D 11/04
[52] U.S. Cl. ................................. 423/157; 75/101 BE
[58] Field of Search ..................... 423/157; 75/101 BE

[56] References Cited

U.S. PATENT DOCUMENTS

| | | | |
|---|---|---|---|
| 2,344,886 | 3/1944 | Lieber | 252/42.7 |
| 3,104,971 | 9/1963 | Olson | 75/108 |
| 3,131,998 | 5/1964 | Swanson | 423/493 |
| 3,488,703 | 1/1970 | Lee | 423/157 |
| 3,558,288 | 1/1971 | Burrows | 423/24 |
| 3,700,416 | 10/1972 | Lucid | 75/101 BE |
| 3,742,062 | 6/1973 | Chappelow, Jr. et al. | 75/117 |
| 3,793,433 | 2/1974 | Seeley et al. | 75/101 BE |

OTHER PUBLICATIONS

Stary, "The Solvent Extraction of Metal Chelates," The MacMillan Co., 1965, pp. 51–78.

*Primary Examiner*—O. R. Vertiz
*Assistant Examiner*—Wayne A. Langel
*Attorney, Agent, or Firm*—Gene O. Enockson; Patrick J. Span

[57] ABSTRACT

Magnesium values are selectively extracted from aqueous solutions thereof also containing calcium using quaternary ammonium salts of selected hydrogen ion exchange reagents. Magnesium is stripped from the resulting organic phase with acids.

13 Claims, No Drawings

PROCESS FOR THE RECOVERY OF MAGNESIUM

The present invention relates to the recovery of magnesium from aqueous solutions thereof such as sea water which also contain calcium ions. More particularly, it relates to such a process using certain salts of quaternary ammonium compounds and selected hydrogen ion exchange agents.

Presently, most of the magnesium sold in the United States is derived from sea water where it is present at about 1.3 g./l. Processing involves several steps: precipitation, decantation, filtration, neutralization, drying, evaporation and electrolysis, Processing is said to be difficult and to require equipment of high capital cost (see Encyclopedia of Chemical Technology, 2nd Ed., Vol. 12, pp. 667–675, Wiley Interscience, 1967). It would be highly desirable to provide a process of less complexity and cost for the recovery of magnesium from sea water.

I have now discovered that magnesium can be selectively recovered from aqueous solutions also containing calcium ions by using certain salts of quaternary ammonium compounds and selected hydrogen ion exchange agents. Thus the magnesium and calcium containing aqueous solution is contacted with a solution of the quaternary ammonium salt in an essentially water-immiscible organic solvent to selectively extract magnesium values into the organic phase. The magnesium values can then be conventionally stripped from the loaded organic phase.

The starting quaternary ammonium salts can be formed by washing the corresponding solution of the hydrogen ion exchange reagent and the quaternary ammonium compound with water or aqueous bases. Such neutralization or salt formation step can be illustrated by the following equation (when a base is used):

$$LH_{org.} + QX_{org.} + B_{aq.} \rightarrow QL_{org.} + BHX_{aq.}$$

where L is the anion of the hydrogen ion exchange agent, Q is the quaternary ammonium cation, X is the inorganic anion of the starting quaternary ammonium compound and B is the base. This can be further illustrated in respect of the use of a specific base as follows:

$$2LH_{org.} + Q_2X + 2NaHCO_{3aq.} \rightarrow 2QL_{org.} + Na_2X_{aq.} + 2CO_2$$

This formed salt solution is then used to contact the aqueous magnesium and calcium containing solution to extract at least part of the magnesium values into the organic phase. The extraction step in its simplest form can be illustrated (for example with $MgCL_2$ in the aqueous solution) by the following equation:

$$2QL_{org.} + MgCl_{2aq.} \rightarrow L_2Mg_{org.} + 2QCl_{org.}$$

However, the following reactions may also be taking place:

$$4QL_{org.} + MgCl_{2aq.} \rightarrow L_4MgQ_{2org.} + 2QCl_{org.}$$

$$3QL_{org.} + MgCl_{2aq.} \rightarrow L_3MgQ_{org.} + 2QCl_{org.}$$

The loaded organic phase can then be stripped of magnesium values by contacting the same with acid--ie. aqueous acidic solutions. This can be illustrated (in the simplest form) by the following equation:

$$L_2Mg_{org.} + 2QCl_{org.} + 2HCl_{aq.} \rightarrow 2LH_{org.} + 2QCl_{org.} + MgCl_{2aq.}$$

The concentrated magnesium values are then recovered from the aqueous phase by conventional techniques, especially electrodeposition. Following the stripping stage, the organic phase can again be neutralized as previously indicated to form the salt of the hydrogen ion exchange reagent and the quaternary ammonium compound and the thus neutralized organic phase recycled for use for further magnesium extractions.

The entire process can be operated continuously as in past practices with the results being selective extraction of magnesium over calcium and the production of a relatively pure, concentrated magnesium containing solution (i.e. the stripping solution) from which magnesium can be recovered by conventional techniques. The equations given above are illustrative only and it will become apparent from the following description that several groups of hydrogen ion exchange agents can be used as well as various quaternary ammonium compounds, neutralizing solutions and the like.

The hydrogen ion exchange reagents usable in the present invention include β-diketones, fluorinated β-diketones, 8-hydroxyquinolines, chloro or bromo substituted 8-hydroxyquinolines, benzoxazoles and mixtures thereof. All of such reagents have acceptable solubility of at least 2% by weight in the essentially water-immiscible organic solvents.

β-diketones desirably used in the present invention have the formula:

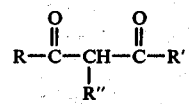

where r is phenyl or alkyl substituted phenyl, R' is alkyl, alkyl substituted phenyl or chloro substituted phenyl and R" is H or —CN with the provisos that: (1) when R is phenyl, R' is a branched chain alkyl group of at least seven carbon atoms and (2) when R is alkyl substituted phenyl, the number of carbon atoms in the alkyl substituent or substituents is at least 7 and at least one such alkyl substituent is branched chain. Compounds of this group are further described in MacKay and Rogier U.S. patent application Ser. No. 391,432, filed Aug. 24, 1973 and the corresponding Belgian Pat. No. 819,136 which description is incorporated herein by reference.

The said diketones of the aforementioned MacKay et al. application are prepared by known techniques. A preferred procedure is that generally described by Swamer and Houser in J. Amer. Chem. Soc., 72, 1352 (1950). Thus a lower alkyl ester is condensed with a compound containing an acetyl moiety in the presence of sodium hydride and an inert organic solvent. Typical inert organic solvents are diethyl ether and tetrahydrofuran.

The said diketone preparations can be further described by the following examples.

EXAMPLE A

A dispersion of 16.9 g. (0.4 mole) of 57% by weight sodium hydride in mineral oil was slurried with n-pentane under nitrogen and the supernatant liquid was removed by suction through a sintered glass tip tube. The process was repeated three times before 500 ml. of dry diethyl ether was added at once. The mixture was slurried and 35.2 g. (0.4 mole) of ethyl acetate was rapidly added. Then about 2 ml. of dodecylacetophenone (the dodecyl group is branched chain and was derived from tetrapropropylene via alkylation therewith) was added to the slurry. No gas evolution was indicated on a wet test meter, so two drops of absolute ethanol were added. After about an hour, vigorous gas evolution occurred and the remaining dodecylacetophenone was added as a 25% by weight solution in diethyl ether. The total ketone added was 57.6 g. (0.2 mole) and the addition was performed at such a rate as to maintain solvent The generalized reaction for preparing the diketones is as follows:

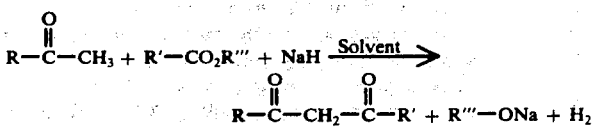

Examples B-K were carried out in essentially the same manner as Example A with the reactants, mole ratios and solvents set forth in the following Table A:

Table A

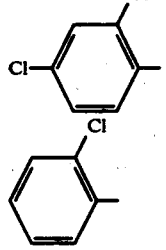

| Example | R | R' | R''' | Mole Ratios $RCCH_3$ | $R'CO_2R'''$ | NaH | Solvent | % Yield | B. Pt. ° C. |
|---|---|---|---|---|---|---|---|---|---|
| B | $C_{12}H_{25}$—φ—[8] | $C_8H_{17}$[1] | $C_2H_5$ | 0.2 | 0.4 | 0.4 | $Et_2O$ | 23 | 150-190 (0.2 mm.) |
| C | $C_{12}H_{25}$—φ— | $C_7H_{15}$[2] | $C_2H_5$ | 0.5 | 0.7 | 1.0 | $Et_2O$ | 65 | 190-240 (0.6 mm.) |
| D | $C_{12}H_{25}$—φ— | $(CH_3)_3C$—φ— | $C_2H_5$ | 1.0 | 1.2 | 2.2 | $Et_2O$ | 81 | —[3] |
| E | φ— | $C_{17}H_{35}$—[4] | $C_2H_5$ | 1.0 | 1.47 | 2.4 | $Et_2O$ | 39 | 205-212 (0.3 mm.) |
| F | φ— | $C_7H_{15}$—[2] | $C_2H_{15}$ | 1.0 | 1.4 | 2.4 | $Et_2O$ | 73 | 135-150 (0.5 mm.) |
| G | $C_9H_{19}$—φ—[5] | $CH_3$— | $C_2H_5$ | 1.0 | 1.2 | 2.2 | THF[6] | 85 | 155-162 (—) |
| H | $C_{12}H_{25}$—φ— | $CH_3$—φ— | $CH_3$ | 1.0 | 1.2 | 2.1 | THF | 97 | —[3] |
| I | $C_9H_{19}$—φ— | $CH_3$—φ— | $CH_3$ | 0.48 | 0.6 | 1.2 | THF | 74 | —[3] |
| J | $C_{12}H_{25}$—φ— | (dichlorophenyl) | $C_2H_5$ | 1.0 | 1.05 | 2.2 | $Et_2O$ | 75 | 250-260 (.02-.04 mm.)[7] |
| K | $C_{12}H_{25}$—φ— | (chlorophenyl) | $C_2H_5$ | 0.77 | 0.87 | 1.80 | $Et_2O$ | 71 | 235-250 (.13-.25 mm.)[7] |

[1]The octyl group is $(CH_3)_3CCH_2CHCH_3CH_2$— and is derived from Isononanoic Acid (American Hoechst Corp.)
[2]The heptyl group is a mixture of isomeric dimethyl pentyl groups and is derived from Isooctanoic Acid (American Hoechst Corp.)
[3]Not possible to satisfactorily distill in a pot distillation. No molecular distillation attempted.
[4]Derived from Isostearic Acid (Emery Industries) - a mixture of isomeric, branched $C_{18}$ acids.
[5]The nonyl group is that obtained from alkylation of benzene with tripropylene.
[6]n-Heptane used to dissolve the β-diketone during the work-up of reactions where tetrahydrofuran was used as the reaction solvent.
[7]Wipe-film still distillation.
[8]The symbol "φ—" designates a benzene ring,

and all alkyl groups are primarily in the para position.

reflux. When the addition was complete, the mixture was stirred until gas evolution ceased—1 to 2 hours. Another 150 ml. diethyl ether was added and the excess sodium hydride was neutralized by the careful addition of absolute ethanol. When the sodium hydride failed to react, the reaction mixture was poured onto a mixture of ice and conc. hydrochloric acid with vigorous stirring. The phases then were separated and the upper organic phase was washed twice with water, once with 10% sodium bicarbonate, and finally once with water. After drying over anhydrous magnesium sulfate, the solvent was distilled under reduced pressure. The product distilled at 96°-160° C. (0.5 mm. Hg.) and 39.2 g. of product was obtained (yield of 59%). The β-diketone product had the following structure (confirmed by its infrared spectrum):

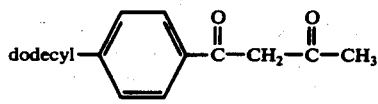

EXAMPLE L

A dispersion of 16.9 (0.4 mole) of 57% by weight sodium hydride in mineral oil was slurried with n-pentane under nitrogen and the supernatant liquid was removed by suction through a sintered glass tip tube. The process was repeated three times before 500 ml. of dry diethyl ether was added at once. The mixture was slurried and 60.8 g. (0.2 mole) of methyl dodecylbenzoate (the dodecyl group is as obtained in the alkylation of benzene with tetrapropylene) was rapidly added. Then 20.0 g. (0.02 mole) of pinacolone and two drops of methanol were rapidly added. Only a slow evolution of gas was observed on the wet test meter. After three days of continuous stirring, 7.5 l. of gas was evolved and the remaining sodium hydride was neutralized by the careful addition of absolute ethanol. When no further reaction was observed, the mixture was poured onto a mixture of ice and concentrated hydrochloric acid with vigorous stirring. The phases then were separated and the upper organic phase was washed twice with water, once with 10% sodium bicarbonate, and finally once with water. After drying over anhydrous magnesium sulfate, the solvent was distilled under reduced pressure. The product distilled at 110°-180° C. (0.3 mm. Hg.) and 54.1 g. of product was obtained. The infrared spectrum and gas-liquid chromatograph of the distillate indicated that 70% of it had the following structure,

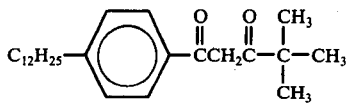

while the remainder was mostly methyl dodecylbenzoate.

EXAMPLE M

A solution of 80.6 g. (0.195 mole) of the β-diketone of Example C in 1 l. of cyclohexane was shaken with an equal volume of aqueous solution containing 0.2 M copper sulfate, 0.5 M ammonia, and 0.5 M ammonium carbonate. After a few minutes of shaking, the phases were separated and the organic phase was shaken again with fresh aqueous solution. After phase separation, the copper rich organic phase was dried over anhydrous sodium sulfate. The sodium sulfate was removed by filtration.

A stream of cyanogen chloride gas was slowly bubbled through the solution of copper-β-diketone complex. Copious quantities of solids were precipitated during the addition. The reaction was followed by infrared spectroscopy and when the ratio of absorbances at 1615 cm$^{-1}$ to 2220 cm$^{-1}$ became constant at about 3.1, the addition was terminated. The time of addition was about two hours. A portion of the reaction mixture was clarified by filtration, the remainder was centrifuged. After decanting the supernatant, it was combined with the filtrate and washed twice with 3 N sulfuric acid. The organic phase was then dried over anhydrous sodium sulfate. The solvent was removed by distillation under reduced pressure leaving 79.5 g. (95% yield) of residue. A GLC analysis of the product indicated that it was at least 97% pure and infrared analysis confirmed the following structure:

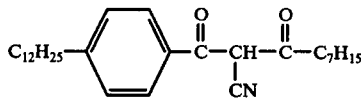

Fluorinated β-diketones also find use in the invention, such compounds having the formula:

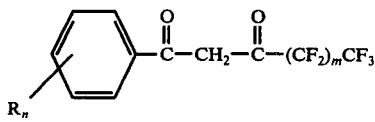

where $n$ is a whole integer of 1 to 4, $m$ is 0, 1 or 2 and R is an alkyl group of 1-25 carbons. Fluorinated β-diketones are variously described in U.S. Pat. Nos. such as: 2,916,349; 2,632,763; 2,830,066; etc.

Another group of hydrogen ion exchange agents useful in the present invention are benzoxazoles of the formula:

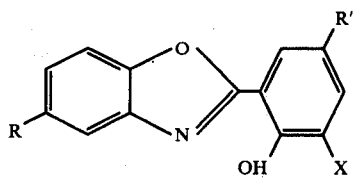

where R is hydrogen or an alkyl group having from 1 to 20 carbon atoms, R' is hydrogen, chlorine or an alkyl group containing from 1 to 20 carbon atoms, X is H or chlorine and the total number of carbon atoms in R and R' is 6 to 40 with the proviso that one of R and R' must be an alkyl group of at least 6 carbon atoms. These compounds are further described in MacKay and Rogier U.S. patent application Ser. No. 518,011, filed Oct. 25, 1974 which description is incorported herein by reference.

Substituted β-hydroxyquinolines also find use in the invention. The basic structure of these compounds is

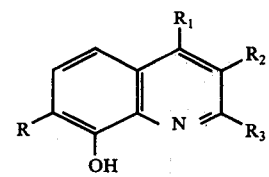

where R is a branched chain alkyl or alkenyl radical containing about 8 to 20 carbon atoms and $R_1$, $R_2$ and $R_3$ are hydrogen or alkyl groups of 1 to 4 carbon atoms. The corresponding 5-chloro or bromo compounds of the formula

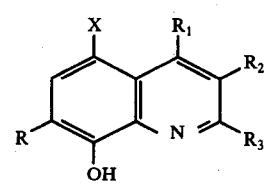

are also useful in the invention and are described in Mattison U.S. patent application Ser. No. 447,629, filed Mar. 4, 1974 which description is incorporated herein by reference.

The 7-alkenyl substituted compounds of the said Mattison application may be prepared by reacting 5-chloro (or bromo) -8-hydroxyquinoline with an alkenyl chloride in the presence of sodium hydroxide and dimethylsulfoxide with subsequent heating. The 7-alkyl substituted compounds of the said Mattison application are desirably prepared by reacting 8-hydroxyquinoline with an alkenyl chloride in the presence of sodium hydroxide and the dimethylsulfoxide solvent (heating to rearrange as above). The produce is then hydrogenated and chlorinated or brominated. The compounds wherein $R_1$, $R_2$, or $R_3$ are alkyl are desirably prepared by reacting 2-amino-4-chloro (or bromo) phenol with an α,β-unsaturated aldehyde in the presence of 2-nitro-4-chloro (or bromo) phenol, ferrous sulfate and sulfuric acid. Such $R_1$, $R_2$, or $R_3$ substituted 5-chloro (or bromo)-8-hydroxyquinoline is then reacted as above with an alkenyl chloride. The details of these reactions are further set forth in the examples to follow.

EXAMPLE N

Five hundred ml. dimethyl sulfoxide, 179 gm. (1.0 mole) 5-chloro-8-hydroxyquinoline, 40 gm. sodium hydroxide and 243 gm. (1.2 Mole) dodecenyl chloride (5,5,7,7-tetramethyl-1-chloro-2-octene available from Rohn & Haas) were combined with stirring in that order in a one liter round bottom flask. Stirring was continued overnight at 70° C. (18 hr.). Five hundred ml. H$_2$O and 500 ml. Skellysolve B (a normal hexane solvent) were added and the mixture shaken. The aqueous layer was extracted with another 250 ml. Skellysolve B. The total organic layer was washed to pH 5 with water and then with about ½ liter Claisen's alkali (in portions). It was again washed with H$_2$O until neutral and then with aqueous NaCl and dried. The product was stripped of solvent to yield 369.3 gm. of a dark oil. Of this amount, 365.3 gm. was distilled through a one foot Vigreaux column. A 231.8 gm. fraction distilling off between 160°–170° C. at .06 mm Hg consisted in excess of 97% of 5-chloro-7-dodecenyl-8-hydroxyquinoline having the structure:

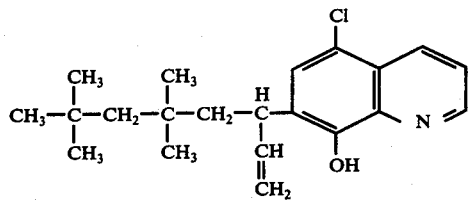

EXAMPLE O

Part A — Preparation of 7-dodecenyl-8-hydroxyquinoline.

One hundred forty five grams (1.0 mole) 8-hydroxyquinoline, 40 gm. sodium hydroxide, 500 ml. methanol and 5 gm. potassium iodide were combined in a two liter round bottom flask. To this was added 243 gm. dodecenyl chloride (as used in Example I) and the mixture stirred under reflux overnight. The product was filtered, taken up in ether and washed with 500 ml. Claisen's alkali (in five portions). The ether solution was washed several times with water until neutral, dried and the solvent stripped to yield 317.9 gm. of crude product. Of this amount, 310.9 gm. was distilled through a one foot Vigreaux after being heated in the pot to 230° C. and cooled to about 100° C. The fractions coming off at 197°–202° C., 0.7 mm. Hg. (51.1 gm.) and 202°–231° C., 0.8 mm. Hg. (96.8 gm.) consisted almost entirely of 7-dodecenyl-8-hydroxyquinoline.

Part B — Hydrogenation of 7-dodecenyl-8-hydroxyquinoline.

Ten grams 7-dodecenyl-8-hydroxyquinoline were dissolved in 90 ml. 95% ethanol and 1.0 gm. hydrogenation catalyst (palladium on carbon) was added. This was charged to a Paar Bomb which was degassed and charged to 35 psig with H$_2$. The pressure fell to 14 psig in 16 min. and was then repressurized to 29 psig. Over 1½ hours this fell to 19.5 psig. The reactor was degassed at aspirator vacuum, N$_2$ bled in and the mixture filtered giving a plum purple solution. Solvent stripping left 9.0 gm. of product which was a dark oil. Infrared analysis showed the product to be 7-dodecyl-8-hydroxyquinoline.

Part C — Chlorination of 7-dodecyl-8-hydroxyquinoline.

Forty five grams (0.144 mole) 7-dodecyl-8-hydroxyquinoline prepared as in Part B was dissolved in 180 ml. methanol (absolute) at 25° C. and then 12.8 gm. Cl$_2$ (0.180 mole) was bubbled in over ½ hr. at 21°–25° C. with good stirring. Stirring was continued 50 min. and the solvent stripped on a rotary evaporator. The residue was taken up in ether and washed with H$_2$O to pH 5, dried and the ether stripped. The residue weighed 46.3 gm. of which 43 gm. was recrystallized from absolute ethanol giving 24.5 gm. of gold colored platelets (m.p. 88.5°–90° C.). The product was 5-chloro-7-dodecyl-8-hydroxyquinoline having the structure:

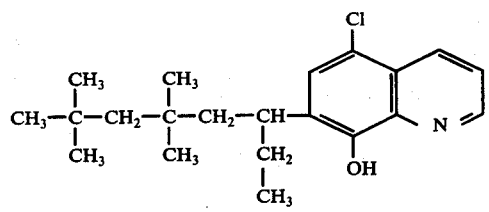

EXAMPLE P

To 5.0 gm. 7-dodecyl-8-hydroxyquinoline as prepared in Part B of Example O dissolved in 12 ml. methanol was added 2.56 gm. Br$_2$ over a ten minute period at 25°–30° C. with stirring. The solution was stirred for an additional hour at 25° C. and was then taken up in ether and washed with water to pH 5. The product solution was further washed with saturated aqueous NaCl, dried and the ether stripped to give 6.0 gm. of a brown solid. The 5-bromo-7-dodecyl-8-hydroxyquinoline had the structure:

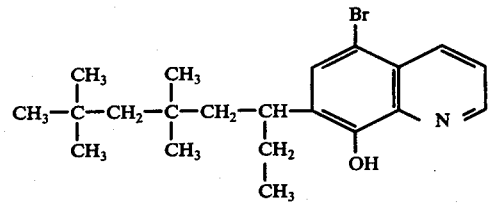

EXAMPLE Q

Example N was essentially repeated using triisobutenyl chloride in place of the indicated dodecenyl chloride. The triisobutenyl chloride was prepared as follows. To a two liter, three neck round bottom flask equipped with a stirrer, dry ice condenser and a gas inlet tube was charged 700 g. (4.16 mole) triisobutylene (available from Eastman Kodak). The flask was heated to 95° C. and 266 gm. (3.75 mole) Cl$_2$ was added over 1½ hr. at 95°–105° C. The reaction mixture was cooled overnight and then distilled through a 1 ft. Vigreaux column. The product obtained from the triisobutylene chloride had the structure:

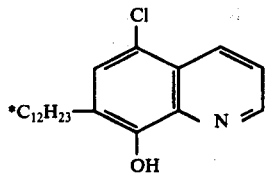

*The C₁₂H₂₃ radical is highly branched, the exact nature of the branching being dependent on the particular starting material (isobutylene) and conditions of its manufacture.

EXAMPLE R

Example Q was essentially repeated using tetrapropenyl chloride in place of the indicated dodecenyl chloride of Example N. The tetrapropenyl chloride was prepared as follows: Into the reaction flask was charged 1000 gm. (5.98 mole) tetrapropylene (available from Enjay Chemical). The flask was heated to 95° C. and 377 gm. (5.37 mole) Cl₂ was added over three hours at 95°-100° C. The product was distilled through a 1 ft. Vigreaux column. The product had the structure:

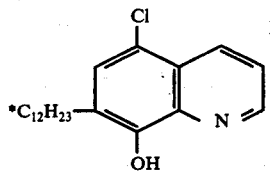

*Same comment as Example Q above, but with tetrapropylene.

EXAMPLE S

Example Q was essentially repeated using diisobutenyl chloride in place of the indicated dodecenyl cloride of Example N. The diisobutenyl chloride was prepared as follows: Into the reaction flask was charged 1000 g. (8.91 mole) of diisobutylene. The flask was heated to 95° C. and the Cl₂ (566 gm., 7.98 mole) was added over 5 hours at 95°-100° C. The product was then distilled through a 1 ft. Vigreaux column. The product had the following structure:

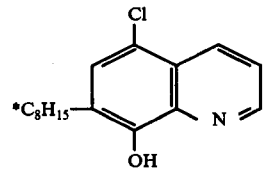

*Similar reasons as in Examples Q and R above.

EXAMPLE T

Into a one liter, three neck round bottom flask fitted with a stirrer, condenser and thermometer was charged 72 gm. (0.5 mole) 2-amino-4-chlorophenol, 43.4 gm. (.25 mole) 2-nitro-4-chlorophenol, 5 gm. ferrous sulfate and 70 ml. sulfuric acid (conc.). This mixture was heated to 140° C., the thermometer was replaced with an addition funnel and 112 gm. (1.6 mole) methacrolein was added dropwise over 40 min. so as to maintain moderate reflux (initial temp. 140° C., 80° C. at completion of addition). The reaction mixture was refluxed for four hours, water was added and excess 2-nitro-4-chlorophenol was steam distilled off. The solids recovered from the neutralized (50% KOH solution followed by saturated Na₂CO₃) pot residue were dissolved in 1.4 liter of methanol and filtered to remove insoluble tars. After stripping the methanol, the residue was extracted with hot 10% HCl, filtered to remove solids, and the solids were twice treated with hot acid. The combined acid solutions were washed twice with chloroform, neutralized (KOH-Na₂CO₃ solutions as above) and the resulting precipitate was filtered off and air-dried. This material was dissolved in ether, filtered and evaporated to give 15.7 g. of crude product. Crystallization of a portion from ether - petroleum ether gave white needles, m.p. 125°-127° C.

The procedure of Example N was essentially repeated using 15.7 gm. (0.08 mole) 3-methyl-5-chloro-8-hydroxyquinoline as above prepared in place of the 5-chloro-8-hydroxyquinoline and 20 gm. of dodecenyl chloride. The product, 3-methyl-5-chloro-7-dodecenyl-8-hydroxyquinoline had the structure:

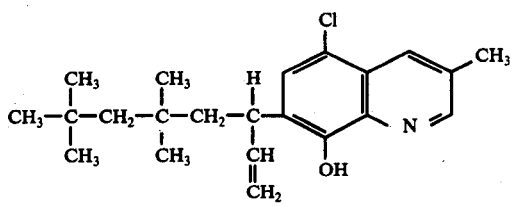

EXAMPLE U

Example N was essentially repeated using 2-methyl-8-hydroxyquinoline in place of 5-chloro-8-hydroxyquinoline. The resulatant 2-methyl-7-dodecenyl-8-hydroxyquinoline was hydrogenated by the procedure of Example O, Part B to give 2-methyl-7-dodecyl-8-hydroxyquinoline.

Chlorination: A stirred suspension of 23.7 g. (0.073 mole) of 2-methyl-7-dodecyl-8-hydroxyquinoline in 100 ml. of methanol was maintained at 0°-5° C. during the addition of a solution of 5.3 g. (0.074 mole) of Cl₂ in 100 ml. of methanol over 5-10 min. After addition was complete, the mixture was stirred at 0° C. for 1 hr., then at room temperature overnight.

The mixture was poured into an ice-cold NaHCO₃ solution (final aq. pH 7-8) and extracted with ether. The extract was washed with water, dried over MgSO₄, filtered and evaporated to give 19.8 g. of product containing

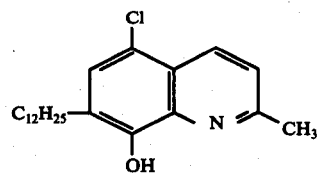

plus a carbonyl-containing impurity (probably

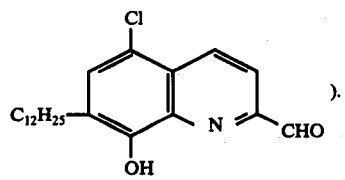

).

A mixture of the crude product, 10 g. of Girard's P reagent (acetohydrazide pyridinium chloride) and 10 ml. of acetic acid in 100 ml. of 95% ethanol was refluxed for 45 min., cooled and neutralized with saturated Na₂CO₃ solution. After addition of water and ether extraction the extract was washed with water, dried over MgSO₄, filtered and evaporated to give 15.6 g. of product as a clear red oil.

EXAMPLE V

Example U was essentially repeated except that Br₂ was used in place of Cl₂. The product, 2-methyl-5-bromo-7-dodecyl-8-hydroxyquinoline had the structure:

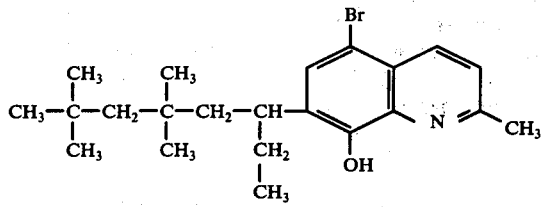

EXAMPLE W

Example U was essentially repeated except that 4-methyl-8-hydroxyquinoline was used in place of 2-methyl-8-hydroxyquinoline. The 4-methyl starting material was prepared as follows: In a 1 liter 3 neck round bottom flask fitted with a stirrer, thermocouple, addition funnel and reflux condenser was placed 300 g. of polyphosphoric acid. The acid was heated to 90° C. and 109 g. (1.0 mole) of o-aminophenol was added over 2.5 hrs. in 7-8 portions with vigorous stirring. After addition was complete, the mixture was stirred at 90°-100° C. for 10 min., then 105 g. (1.5 mole) of methyl vinyl ketone was added portionwise over 1.5 hrs. With each addition the temperature rose to 120°-130° C. After addition was complete, the mixture was stirred at 110° C. for 45 min., then cooled to 70° C. and 200 ml. of water was added. The mixture was stirred at room temperature for 30 min., then allowed to sit overnight.

Volatile materials were steam-distilled off and the precipitate from the neutralized residue (50% KOH followed by saturated Na₂CO₃ solution) was filtered, washed with water and air-dried. The dried precipitate was triturated with chloroform, filtered, and the remaining solid (o-aminophenol) was washed with chloroform.

The combined chloroform solutions were washed with water, dried over MgSO₄, filtered and evaporated to give 74.8 g. of crude product. Crystallization from ethanol gave 58.2 g. of light brown solid, m.p. 137°-139° C., and an additional 9.1 g. was obtained by sublimation (130°-140° C. and 0.1 mm.) of the mother liquors. The product after alkylation and hydrogenation as in Example O followed bu chlorination and purification as in Example U had the structure:

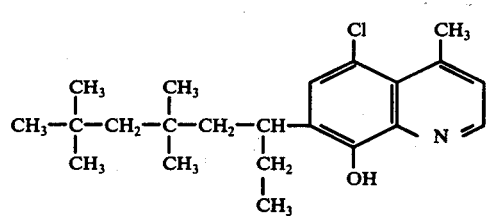

As indicated previously, the selected hydrogen ion exchange agents are neutralized with the quaternary ammonium salt. Quaternary ammonium salts are well known and a wide variety of the same may be used in the present invention. The cation proportion of such quaternary ammonium compounds can be illustrated as follows:

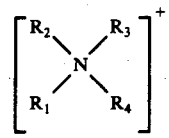

where $R_1$ is a hydrocarbon radical such as alkyl, alkenyl, aryl, alkaryl, arylalkyl and the like of 6 to 24 carbon atoms and $R_2$, $R_3$ and $R_4$ are hydrocarbon radicals of 1 to 24 carbon atoms. Representative anions $X^-$ and $X^=$ are chloride, bromide, iodide, sulfate, bisulfate and the like.

Representative of the above quaternary ammonium compounds are lauryltrimethyl ammonium chloride, myristyltrimethyl ammonium chloride, palmityltrimethyl ammonium choloride, lauryltrimethyl ammonium sulfate, myristyltrimethyl ammonium bromide, palmityltrimethyl ammonium iodide, stearyltrimethyl ammonium chloride, stearyltrimethyl ammoniun sulfate, oleyltrimethyl ammonium chloride, oleylbutyldimethyl ammonium sulfate, dilauryldimethyl ammonium chloride, distearyldimethyl ammonium sulfate, trilaurylmethyl ammonium chloride, trioctylmethyl ammonium bromide, tridecylmethyl ammonium chloride, stearylbenzyldimethyl ammonium sulfate, oleylbenzyldiethyl ammonium chloride and the like.

The hydrogen ion exchange reagent, the quaternary ammonium salt, and the magnesium complex of the hydrogen ion exchange reagent must all be soluble in the essentially water-immiscible organic solvents to an extent of at least 2% by weight in order to practically recover metal values on a commercial scale. The organic solvents are preferably aliphatic or aromatic hydrocarbons such as the petroleum derived liquid hydrocarbons including kerosene, fuel oil, etc. In addition to the simple hydrocarbon solvents, chlorinated hydrocarbons may also be used. Accordingly, both the unsubstituted and the chlorinated solvents are contemplated by the term "liquid hydrocarbon".

It is essential in my process to use the salt of the selected hydrogen ion exchange agents and the quaternary ammonium compounds. This salt is prepared by dissolving the hydrogen ion exchange agent and the starting quaternary ammonium salt in the organic solvent and then neutralizing (i.e., removing inorganic acid therefrom) by washing with water or aqueous base. In use, the said salt will preferably be present in an amount of about 2 to 15% by weight in the solvent. Also, in continuous extraction processes, the quaternary ammonium salt of the hydrogen ion exchange reagent will be continuously regenerated as a separate step in the overall process subsequent to stripping of the magnesium loaded phase and prior to use for further extraction. The hydrogen ion exchange reagent and the starting quaternary ammonium compound will preferably be used in essentially equimolar amounts, although excesses of either in the nature of mole ratios of quaternary to reagent of about 3:5 to 7:5 have been found to not appreciably effect the degree of extraction or selectivity.

As indicated, the neutralization is carried out by water washing or with aqueous solutions of bases. The latter are preferred with representative bases being sodium bicarbonate, sodium hydroxide, sodium carbonate, potassium hydroxide, calcium hydroxide, potassium carbonate, ammonia or ammonium hydroxide, and the like. For some of the selected hydrogen ion exchange reagents, it may be necessary to use a strong base such as sodium hydroxide in preference to sodium bicarbonate for example.

In its general aspects, the magnesium recovery process of the present invention comprises contacting an aqueous magnesium and calcium containing solution with an organic solvent solution of the quaternary ammonium salt of the selected hydrogen ion exchange reagent to extract at least a portion of the magnesium values into the organic phase, separating the magnesium pregnant organic phase from the aqueous phase and stripping at least a portion of the magnesium values from the organic phase by contacting same with an acid stripping agent. In most, if not all, commercial operations, the organic phase must be regenerated for economic purposes. As such, the process of the invention will then comprise the steps of neutralizing the stripped organic phase and recycling the organic phase for contacting further quantities of the magnesium and calcium containing aqueous solution. The phase ratios in these steps can be varied widely as it will be apparent that the contacting, for example, of any quantity of the organic phase with the aqueous magnesium and calcium containing phase will result in extraction of magnesium into the organic phase. However, for commercial practicality, the various organic:aqueous phase ratios are preferably in the range of 10:1 to 1:10. Also for practical purposes, the extractions (and stripping and neutralization) are normally carried out at ambient temperatures and pressures.

The magnesium loaded organic is preferably stripped using acid stripping mediums which are desirably aqueous such as aqueous sulfuric acid, hydrochoric acid and the like. The starting magnesium and calcium containing solution has a pH of from about 4 to 12, and preferably from about 6 to 9. The optimum pH will vary depending especially upon the particular extractant salt being used therefor.

In order to achieve enhanced selectivity of magnesium extraction over calciium, it is necessary that some magnesium values remain in the starting aqueous solution after the extraction step. In this regard, the concentration of the quaternary ammonium salt of the selected hydrogen ion exchange reagent in the organic phase and/or the organic:aqueous phase ratios and/or contact times will be so controlled as to extract less than 100% of the magnesium values. When the starting aqueous solution is depleted of magnesium values, significant calcium extraction occurs. This is of course undesirable.

The following Examples illustrate preferred embodiments of the invention without being limiting:

EXAMPLE I

Organic solutions containing equal molar concentrations of selected hydrogen ion exchange reagents and starting quaternary ammonium compound in an aromatic petroleum solvent (Aromatic 150 available from Exxon) were first prepared. The starting quaternary (Aliquat®336) was a trialkyl monomethyl ammonium chloride wherein the alkyl groups contained 8 and 10 carbons, such alkyl groups being straight chained and randomly distributed in the quaternary cation. These organic solutions were then mixed with equal volumes of aqueous base (5% wt./vol.) for 60 minutes with shaking to form the salts of the quaternary and the selected hydrogen ion exchange reagents. After phase separation, the respective organic solutions were contacted with shaking for a period of one hour with an equal volume of a synthetic sea water solution of the following composition: 1.40 g/l. $Mg^{++}$, 0.37 g./l. $Ca^{++}$, 12.0 g./l. $Na^+$, 0.5 g./l. $K^+$, 21.6 g./l. $Cl^-$, 5.6 g./l. $Br^-$, pH 6.6 (such solution was made up by dissolving 11.4 g. of $MgCl_2.6H_2O$, 1.4 g. of $CaCl_2.2H_2O$, 26.8 g. of NaCl, 7.2 g. of NaBr and 0.9 g. of KCl in distilled water to a volume of one liter). After the above contacting, the phases were separated and the organic and aqueous layers were analyzed for magnesium and calcium by atomic absorption. The results of these extractions are given in Table 1.

Table 1

| Hydrogen Ion Exchange Agent | Molar conc. | Base Used In Neutralization | Organic (ppm) $Mg^{++}$ | $Ca^{++}$ | Aqueous (ppm) $Mg^{++}$ | $Ca^{++}$ |
|---|---|---|---|---|---|---|
| Fluorinated[1] β-Diketone | .05 | $NaHCO_3$ | 314 | 1.1 | 1040 | 374 |
| 8-Hydroxy-[2] quinoline | 0.1 | NaOH | 443 | 1 | — | — |
| 5-Chloro-8-[3] hydroxyquinoline | 0.1 | NaOH | 710 | 1.3 | 623 | 409 |
| Benzoxazole[4] | 0.025 | $NaHCO_3$ | 168 | <0.5 | 1180 | 375 |
| β-Diketone[5] | 0.5 | $NaHCO_3$ | 9.3 | <0.5 | 1320 | 198 |
| β-Diketone[5] | 0.1 | NaOH | 620 | 0.8 | 680 | 410 |

[1]1-dodecylphenyl-3-trifluoromethyl-1,3-propanedione wherein the dodecyl group is in the para position and was derived from a synthetic alkylbenzene, Chevron alkylate 21, in which the alkyl chain is branched and contains an average of 12 carbon atoms.
[2]7-tetrapropylenyl-8-hydroxyquinoline
[3]5-chloro-7-triisobutenyl-8-hydroxyquinoline
[4]2-(2-hyroxy-3,5-dichlorophenyl)-5-dodecylbenzoxazole (the dodecyl group is branched chain)
[5]1-phenyl-3-heptyl-1,3-propanedione wherein the heptyl group is branched chain.

EXAMPLE II

The process of Example I was partially repeated except using only the fluorinated β-diketone at a concentration of 0.1M with various starting quaternary ammonium compounds (neutralization by $NaHCO_3$). The quaternaries used were as follows:

A. Dihydrogenated tallow dimethyl ammonium chloride (Aliquat®H226)

B. Dicocoa dimethyl ammonium chloride (Aliquat®221)

C. Lauryl trimethyl ammonium chloride (Aliquat®4).

Results are set forth in the following Table 2.

Table 2

| Quaternary | Organic (ppm) | | Aqueous (ppm) | |
|---|---|---|---|---|
| | Mg++ | Ca++ | Mg++ | Ca++ |
| A | 645 | 3.7 | 634 | 373 |
| B | 627 | 4.0 | 970 | 379 |
| C | 598 | 2.1 | 711 | 381 |

EXAMPLE III

The process of Example I was partially repeated except using only the fluorinated β-diketone with varying concentrations of the salt prepared from said β-diketone and the starting quaternary ammonium compound (neutralization by NaHCO₃). Results are set forth in the following Table 3.

Table 3

| Molar Concentration of Diketone-Quat Salt | Organic (ppm) | | Aqueous (ppm) | |
|---|---|---|---|---|
| | Mg++ | Ca++ | Mg++ | Ca++ |
| 1.0 | 1480 | 430 | 0.6 | 6.0 |
| 0.8 | 1550 | 396 | 0.8 | 14.2 |
| 0.6 | 1390 | 333 | 1.3 | 46.5 |
| 0.5 | 1350 | 242 | 5.9 | 247 |
| 0.4 | 1390 | 200 | 7.9 | 190 |
| 0.3 | 1370 | 138 | 60 | 341 |
| 0.2⁽¹⁾ | 1130 | 9.0 | 223 | 336 |
| 0.1 | 643 | 1.4 | 703 | 367 |

⁽¹⁾Shows that with this reagent salt and starting aqueous solution, selectivity of magnesium over calcium is optimized at 0.2M or lower.

EXAMPLE IV

The process of Example I was partially repeated except using only the fluorinated β-diketone and the salt thereof was prepared by neutralization (with the NaHCO₃ solution) of mixtures of varying quantities of 0.2M solutions of the diketone and the starting quaternary ammonium compound (thus in most instances there is either an excess of the diketone or the starting quaternary ammonium compound). Fifty ml. of the synthetic sea water solution was contacted with the combined quantities of quaternary and diketone used in the neutralization step and as indicated in the following Table 4.

Table 4

| Volume (ml) Used in Salt Preparation | | Organic (ppm) | | Aqueous (ppm) | |
|---|---|---|---|---|---|
| Quaternary | Diketone | Mg++ | Ca++ | Mg++ | Ca++ |
| 5 | 50 | 370 | 0.7 | 845 | 385 |
| 10 | 50 | 486 | 0.9 | 790 | 383 |
| 20 | 50 | 515 | 0.6 | 680 | 381 |
| 30 | 50 | 640 | 0.5 | 679 | 383 |
| 40 | 50 | 677 | 1.0 | 672 | 381 |
| 45 | 50 | 683 | 1.2 | 656 | 373 |
| 50 | 50 | 643 | 1.4 | 703 | 367 |
| 55 | 50 | 599 | 1.4 | 740 | 375 |
| 60 | 50 | 578 | 1.4 | 746 | 376 |
| 70 | 50 | 510 | 1.4 | 835 | 371 |

EXAMPLE V

Extraction kinetics were studied by partially repeating Example I except using only the fluorinated β-diketone and quaternary at concentration of 0.1M. Samples were removed at various time intervals and the organic phases were analyzed for magnesium and calcium. Results are set forth in Table 5 which follows.

Table 5

| Time, min. | Organic (ppm) | |
|---|---|---|
| | Mg++ | Ca++ |
| ½ | 236 | 167 |
| ¾ | 296 | 128 |
| 1 | 376 | 86 |
| 2 | 467 | 32 |
| 3 | 521 | 11.8 |
| 6 | 569 | 2.0 |

The above data indicate that calcium is initially extracted but is subsequently displaced from the organic phase by magnesium.

EXAMPLE VI

Portions of a loaded organic prepared as in the Examples above containing 650 ppm Mg++ were shaken for one hour with 5% aqueous hydrochloric acid at various organic:aqueous phase ratios. The separated organics were then analyzed for magnesium. Results are set forth in the following Table 6.

Table 6

| O/A Ratio | Mg++ (ppm) Organic |
|---|---|
| 10/10 | <0.1 |
| 10/8 | <0.1 |
| 10/6 | 0.8 |
| 10/4 | 0.8 |
| 10/2 | 3.2 |
| 10/1 | 4.8 |

The above data illustrate that essentially complete stripping of magnesium is possible with dilute hydrochloric acid even at high O/A phase ratios. The loaded organic as above described was also readily stripped by sparging with HCl gas. In such case, a precipitate formed which was found to be MgCl₂.6H₂O with less than 1% sodium and calcium present. Analysis of the stripped organic showed no magnesium remaining.

The embodiments of the invention in which an exclusive property or privilege is claimed are defined as follows:

1. The process of selectively recovering magnesium from an aqueous solution thereof which also contains calcium ions which comprises contacting said solution with a solution of a quaternary ammonium salt of a hydrogen ion exchange reagent in an essentially water-immiscible organic solvent to extract at least a portion of but less than 100% of the magnesium values into the organic phase, separating the magnesium loaded organic phase from the aqueous phase and stripping magnesium from the organic phase, said hydrogen ion exchange reagent being selected from the group consisting of:

A. β-diketones having the formula

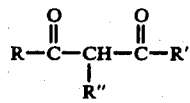

where R is phenyl or alkyl substituted phenyl, R' is alkyl, alkyl substituted phenyl or chloro substituted phenyl and R'' is H or —CN with the provisos that (1) when R is phenyl, R' is a branched chain alkyl group of at least seven carbon atoms and (2) when R is alkyl substituted phenyl, the number of carbon atoms in the alkyl substituent or substituents is at least 7 and at least one such alkyl substituent is branched chain;

B. fluorinated β-diketones having the formula

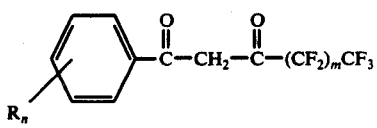

where n is a whole integer of 1 to 4, m is 0, 1 or 2 and R is an alkyl group of 1–25 carbon atoms;

C. benzoxazoles having the formula

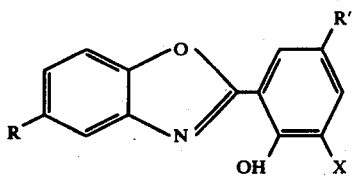

where R is hydrogen or an alkyl group having from 1 to 20 carbon atoms, R' is hydrogen, chlorine or an alkyl group containing from 1 to 20 carbon atoms, X is H or chlorine and the total number of carbon atoms in R and R' is 6 to 40 with the proviso that one of R and R' must be an alkyl group of at least 6 carbon atoms; and D. 8-hydroxyquinolines of the formula

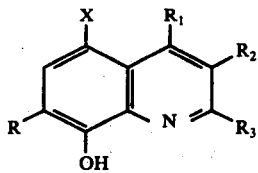

where R is a branched chain alkyl or alkenyl radical containing about 8 to 20 carbon atoms, $R_1$, $R_2$ and $R_3$ are hydrogen or alkyl groups of 1 to 4 carbon atoms and X is H, chlorine or bromine.

2. The process of claim 1 wherein the hydrogen ion exchange reagent is a fluorinated β-diketone (B).

3. The process of claim 2 wherein the fluorinated β-diketone (B) is 1-dodecylphenyl-3-trifluoromethyl-1,3-propanedione.

4. The process of claim 1 wherein the magnesium is stripped using an acid stripping medium.

5. The process of claim 4 wherein the acid stripping medium is an aqueous solution of an acid selected from sulfuric and hydrochloric acid.

6. The process of claim 1 wherein the magnesium and calcium containing aqueous solution has a pH of from about 4 to 12.

7. The process of claim 6 wherein the solution has a pH of from about 6 to 9.

8. The proces of claim 1 wherein the quaternary ammonium salt of the hydrogen ion exchange reagent is present in the essentially water-immiscible organic solvent in an amount of about 2 to 15% by weight.

9. The process of claim 1 wherein the essentially water-immiscible organic solvent is a liquid hydrocarbon.

10. The process of claim 1 wherein quaternary ammonium cation of the salt of the hydrogen ion exchange reagent has the formula:

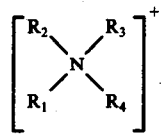

where $R_1$ is a hydrocarbon radical of 6 to 24 carbon atoms and $R_2$, $R_3$ and $R_4$ are hydrocarbon radicals of 1 to 24 carbon atoms.

11. The process of claim 1 wherein the salt is prepared by the neutralization of the hydrogen ion exchange reagent with the starting quaternary ammonium compound in a mole ratio of the latter to the former of about 3:5 to 7:5.

12. The process of claim 1 wherein the stripped organic phase is separated from the acid stripping medium, neutralized to reform the quaternary ammonium salt of the hydrogen ion exchange reagent and recycled for contacting further quantities of the magnesium and calcium containing aqueous solution.

13. The process of claim 1 wherein the hydrogen ion exchange reagent is a fluorinated β-diketone (B), the essentially water-immiscible organic solvent is a liquid hydrocarbon, the pH of the magnesium and calcium containing aqueous solution is from about 6 to 9 and the stripping medium is aqueous sulfuric acid.

* * * * *

UNITED STATES PATENT AND TRADEMARK OFFICE
CERTIFICATE OF CORRECTION

PATENT NO. : 4,051,223
DATED : Sept. 27, 1977
INVENTOR(S) : Kenneth D. MacKay

It is certified that error appears in the above-identified patent and that said Letters Patent are hereby corrected as shown below:

Column 2, Line 39: "r" should be --R--
　　　　　Line 65: "n-pen-" should be -- n-pen- --
Column 4, in Table A, footnote (6):
　　　　"n-Heptane" should be -- n-Heptane --
　　　　Line 57: "(0.02 mole)" should be -- (0.2 mole) --
Column 6, Line 20:
　　　　"β-hydroxyquinolines" should be -- 8-hydroxyquinolines --
　　　　Line 59: "produce" should be -- product --
Column 9, Line 55: "was" should be -- were --
Column 11, Line 54: "bu" should be -- by --
Column 13, Line 61: "calciium" should be -- calcium --
Column 14, in Table 1, in column headed Molar conc.:
　　　　"0.5" should -- 0.05 --
Column 15, Line 65: "concentration" should be -- concentrations --
Column 18, Line 11: "proces" should be -- process --.

Signed and Sealed this

Twentieth Day of June 1978

[SEAL]

Attest:

RUTH C. MASON
Attesting Officer

DONALD W. BANNER
Commissioner of Patents and Trademarks